United States Patent
Claude et al.

(10) Patent No.: US 7,448,384 B2
(45) Date of Patent: Nov. 11, 2008

(54) PROCESS OF DETECTION OF A DIVE START IN A DIVE COMPUTER

(75) Inventors: Stéphane Claude, Grenchen (CH); Laurent Christe, Bienne (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 403 days.

(21) Appl. No.: 11/082,966

(22) Filed: Mar. 18, 2005

(65) Prior Publication Data
US 2005/0205092 A1    Sep. 22, 2005

(30) Foreign Application Priority Data
Mar. 22, 2004  (EP)  ................. 04101172

(51) Int. Cl.
*A61M 16/00* (2006.01)
*A62B 7/00* (2006.01)
*B63C 11/02* (2006.01)
*G01L 9/00* (2006.01)

(52) U.S. Cl. ............... 128/204.22; 73/753; 128/205.23; 128/205.22; 128/201.27

(58) Field of Classification Search ........... 128/200.24, 128/201.26, 201.27, 204.18, 204.22, 204.26, 128/205.22, 201.28, 204.25; 405/185, 186; 368/10, 11; 73/291–295, 753, 754
See application file for complete search history.

(56) References Cited

U.S. PATENT DOCUMENTS

| | | | |
|---|---|---|---|
| 5,737,246 A | * | 4/1998 | Furukawa et al. ........... 702/166 |
| 6,519,548 B1 | * | 2/2003 | Kuroda et al. ............... 702/139 |
| 6,791,903 B2 | * | 9/2004 | Germiquet et al. ............ 368/11 |
| 6,842,402 B2 | * | 1/2005 | Germiquet et al. ............ 368/10 |
| 6,931,348 B2 | * | 8/2005 | Furuta et al. ................ 702/138 |
| 2005/0004711 A1 | * | 1/2005 | Hirose ........................ 700/265 |
| 2006/0012484 A1 | * | 1/2006 | Claude .................... 340/573.6 |

FOREIGN PATENT DOCUMENTS

| | | |
|---|---|---|
| EP | 689 109 A1 | 12/1995 |
| EP | 682 301 A2 | 11/1999 |
| EP | 1 396 766 A1 | 3/2004 |
| EP | 1 396 767 A1 | 3/2004 |

* cited by examiner

Primary Examiner—Justine R. Yu
Assistant Examiner—Annette F Dixon
(74) Attorney, Agent, or Firm—Sughrue Mion, PLLC (57) ABSTRACT

The present invention concerns a method for detecting the start of a dive for implementation in a portable electronic device (1) of the diving computer type. More specifically, the method is for implementation in a device of this type having at least a first operating mode and a second operating mode, called the dive mode. This device includes a pressure sensor (5) for measuring the ambient pressure value (P) and electronic circuits (2) for processing the pressure measurement results including a time base (4) and at least one memory zone (7, 8).

The detection method according to the present invention more particularly proposes making correction to certain measured pressure values before storing them as reference pressure values (Pref). Thus, the start of a dive can be detected with a high level of reliability solely on the basis of ambient pressure measurements.

22 Claims, 4 Drawing Sheets

PROCESS OF DETECTION OF A DIVE START IN A DIVE COMPUTER

This application claims priority from European Patent Application No. EP 04101172.1 filed Mar. 22, 2004 the entire disclosure of which is incorporated herein by reference.

FIELD OF THE INVENTION

The present invention concerns a method for detecting the start of a dive for implementation in a portable electronic device of the diving computer type. More specifically, the method is for implementation in a device of this type having at least a first operating mode and a second operating mode, called the dive mode. This device includes, in particular, a pressure sensor for measuring the value of the ambient pressure and electronic circuits for processing the results of the pressure measurements including a time base and at least one memory zone.

The detection method according to the present invention is based on the study of variations in the ambient pressure as a function of time in order to detect the start of a dive causing a significant increase in the value of the ambient pressure.

The present invention also concerns a portable electronic device especially adapted to implement the aforementioned method.

BACKGROUND OF THE INVENTION

Methods of this type for detecting the start of a dive by using various physical principles are known from the prior art.

EP Patent No. 0 689 109 granted in the name of CITIZEN WATCH CO. LTD. On 16 Dec. 1998, discloses a method of this type, and a portable electronic device for implementing the same. In particular, this device is provided with specific means arranged for detecting when the device enters into contact with water, and a pressure sensor, arranged for measuring the value of the ambient pressure. According to this Patent, the pressure sensor is powered, in a first operating mode, so as to carry out an atmospheric pressure measurement once an hour in order to store the value thereby obtained as the reference pressure value. Moreover, the specific water detection means, which can for example take the form of ohmic contacts arranged on the case of the device, are permanently or periodically powered.

The ohmic contacts thus fulfil a main switch function for the circuits dedicated to the operating mode relating to diving in particular for the pressure sensor. Indeed, when the presence of water is detected at the ohmic contacts, the supply frequency of the pressure sensor is altered such that the ambient pressure measurements are carried out with a period of the order of a second, within the scope of an operating mode called the preparation mode. These measurements allow the value of the pressure variation between the last measured value and the last reference pressure value stored to be calculated, the value of the variation then being compared to a predefined value forming a dive mode trigger threshold. When the pressure variation breaches the trigger threshold, the dive mode is activated. In the opposite case, the sensor is still powered for several minutes to monitor the development of the ambient pressure. Once this time period has elapsed, the preparation mode is deactivated and the pressure sensor is again powered with a period of the order of an hour.

Such a detection method enables a distinction to be made, for example, between a situation in which the person wearing the device wets it by washing his hands and a situation actually corresponding to the start of a dive. In the latter case, the pressure measurements carried out by the pressure sensor enable the start of a dive to be validated after activation of the preparation mode, insofar as the device undergoes contact with water first of all before seeing the ambient pressure increase.

However, this type of device has a significant drawback from the point of view of its construction, arising from the need to provide specific means for detecting the presence of water on the case. In the aforecited case using ohmic contacts, it is in fact imperative that specific means are provided to guarantee that the case of the device is water tight in the area of such contacts, which can have significant consequences as regards the manufacturing cost of the device. Consequently, the method described hereinbefore has a similar drawback because it is based on the implementation of specific means for detecting the presence of water.

Other methods and devices are known from the prior art which do not implement such specific means for detecting the presence of water and which use ambient pressure measurements to detect the start of a dive.

In particular, devices of this type are known wherein a pressure sensor is periodically powered to measure the value of the ambient pressure, the results of such measurements being stored. These devices are arranged such that at each new ambient pressure measurement, the value of the variation between this last measurement and the previous one is calculated and compared to a value defining a trigger threshold. Once the trigger threshold has been breached, the dive mode is activated, the second to last pressure value measured being typically stored as a reference pressure, i.e. it is assumed to correspond to the surface pressure of the body of water in which the dive takes places.

This type of device has, however, a drawback because the accuracy of detection of the start of a dive is entirely based upon the value retained for the trigger threshold.

Thus, if the value retained for this threshold is too low, the device is exposed to a risk of the dive mode being inadvertently triggered. By way of example, if the person wearing such a device comes down a mountain road at a sustained rhythm, the device is capable of considering the corresponding increase in pressure similar to entry into water. On the other hand, if the value retained for the threshold is too high, the trigger precision is liable to be poor if the user stays in the water in proximity to the surface for some time before the start of a dive. In such a case, it is also possible for the stored reference pressure value to be incorrect since it was measured in the water, at a lower depth than that of the trigger threshold. Such an error can, depending on its amplitude, have dangerous consequences for the health of the person wearing the device, particularly from the point of view of data relating to a decompression stop onto which the error would be carried.

SUMMARY OF THE INVENTION

It is a first object of the present invention to overcome the aforementioned drawbacks of the prior art by proposing a method for detecting the start of a dive with increased precision, the detection being carried out on the basis of measured values of the ambient pressure, and a portable electronic device adapted for implementing such a method.

Thus, the invention provides a method of the type indicated hereinbefore, comprising the steps of:
   a) measuring an ambient pressure value and storing it as a reference pressure value;
   b) periodically measuring the ambient pressure value at a first frequency, c) periodically calculating the value of the variation in pressure between the measured ambient pressure and the reference pressure at a first frequency and comparing the pressure variation value to a predefined value, called the trigger threshold stored in the memory zone, d) activating the dive mode if the pressure variation value is higher than the trigger threshold or, in the opposite case, continuing to step e), e) comparing at a second frequency, the pressure variation value to a predefined measurable quantity, stored in the memory zone, or determined on the basis of measured pressure values, said quantity being lower than the trigger threshold, the second frequency being lower than or equal to the first frequency, f) making a correction to the reference pressure value if the pressure variation value is higher than the quantity or, in the opposite case, storing the last measured pressure value as the new reference pressure value, then g) returning to step b).

Alternatively, in step e), the absolute value of the calculated pressure variation is compared to a predefined quantity, stored in said memory zone or determined on the basis of the measured pressure values.

Thus, according to this detection method, the reference pressure value is not systematically updated at a given frequency. The variation in the calculated pressure is taken into account in order to correct a measured ambient pressure value before storing it as the reference pressure. Consequently, increased precision is obtained, with respect to the aforecited devices of the prior art, for detecting the start of a dive.

Preferably, the method according to the present invention further comprises, after step d), the steps of:

d') periodically determining, at a third frequency, the pressure variation sign, the third frequency being comprised between the first and second frequencies, d") storing the value of the last measured pressure as the reference pressure value then returning to step b) if said pressure variation is negative or, in the opposite case, continuing to step e).

These additional steps also increase precision as to the stored reference pressure value by multiplying the updating possibilities with respect to the basic method.

According to a first variant of the present invention, when the quantity is predefined, the latter being called the first correction factor, the correction at step f) consists in adding the first correction factor to the stored reference pressure value, the result of the addition being stored as the new reference pressure value.

According to a second embodiment of the present invention, when the quantity is determined on the basis of measured pressure values, step e) further comprises an action of storing the pressure variation value at the second frequency, at least the last three stored pressure variation values being used to calculate the quantity. This latter corresponds, according to a preferred variant, to the result of the calculation of the mean pressure variation of the last three values, correction at step f) consisting in adding the quantity to the stored reference pressure value, the result of the addition being stored as the new reference pressure value.

BRIEF DESCRIPTION OF THE DRAWINGS

Other features and advantages of the present invention will appear more clearly upon reading the following detailed description, made with reference to the annexed drawings, given by way of non-limiting example and in which.

DETAILED DESCRIPTION

Figure 1:
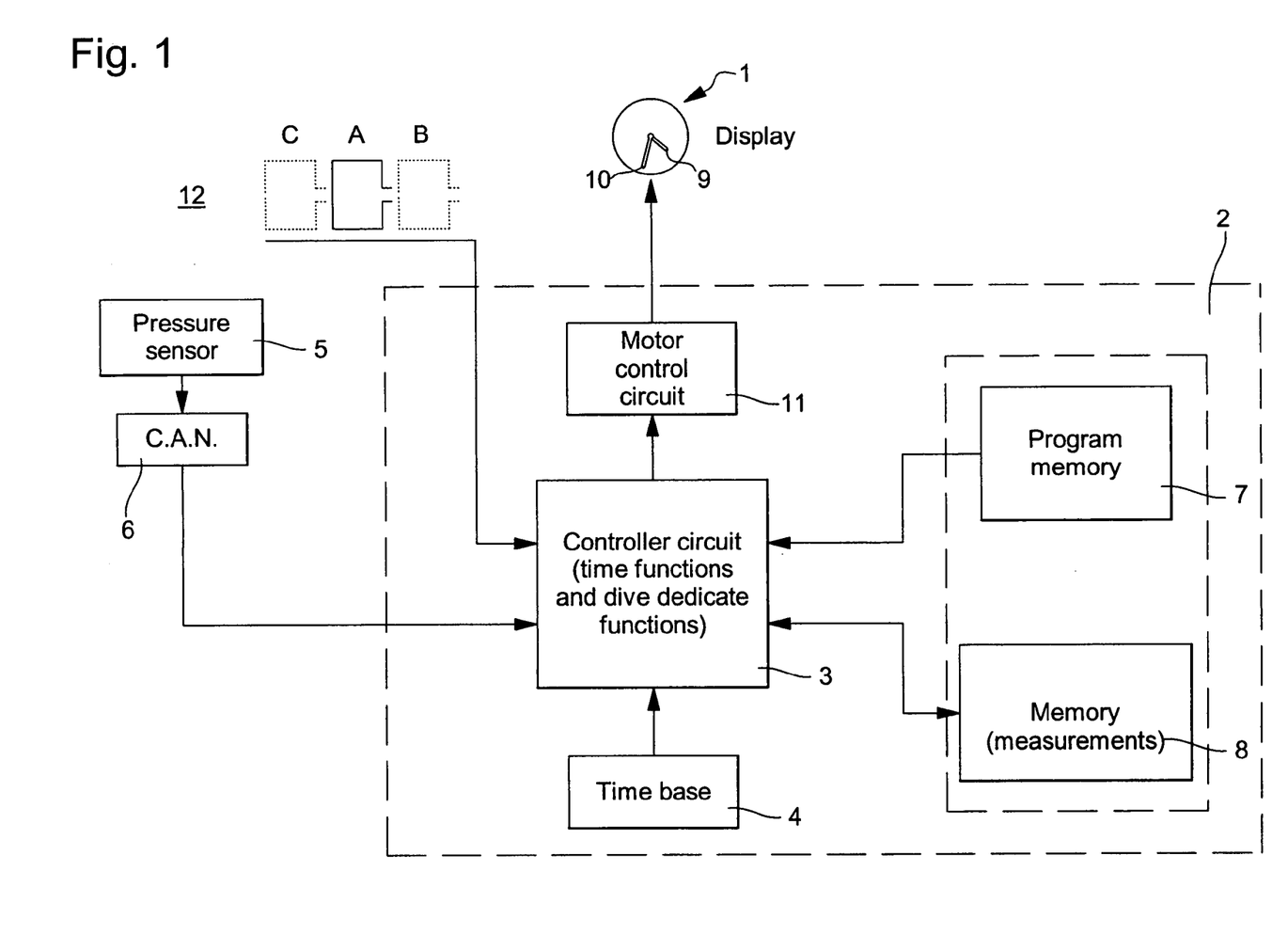
FIG. 1 is a general schematic diagram of the electronic circuit of an example portable electronic device for implementing the method according to the present invention.

FIG. 1 shows schematically a general diagram of the electronic circuit of an example portable electronic device for implementing the method according to the present invention. In the example shown here, the portable electronic device takes the particular form of an electronic diver's watch 1 with an analogue display comprising at least two operating modes, a first time mode and a second dive mode.

Of course, the method according to the present invention is not limited to implementation in a watch but can also be implemented in any type of conventional portable diver's computer without departing from the scope of the present invention.

Generally, the electronic circuit of watch 1 comprises an integrated circuit 2 including a controller circuit 3 capable of managing the conventional time functions of watch 1 comprising, for this purpose, a time division circuit and being connected to a resonator 4 supplying a time base. From this time base, time-related data is produced by controller circuit 3, particularly for carrying out the time mode functions and the functions relating to the dive mode.

Moreover, controller circuit 3 receives at one input signals generated by a pressure sensor 5 generating analogue electrical signals representative of the ambient pressure. These signals pass through an analogue-digital converter 6 before being supplied to the input of controller circuit 3, in the form of a digital signal.

Pressure sensor 5 is of a conventional type and those skilled in the art will not encounter any difficulty in selecting one suited to implementing the present invention.

Integrated circuit 2 also comprises memory zones, particularly a first memory zone 7, preferably of the non-volatile type, containing a programme enabling controller circuit 3 to make calculations relating to the dive mode, on the basis of a decompression algorithm, for example. The choice of a reprogrammable non-volatile memory (Flash or EPROM, for example) enables the calculation programme to be subsequently altered as a function of the decompression algorithm used. Integrated circuit 2 preferably comprises at least a second memory zone 8, also of the non-volatile type, in which measurements and results of the calculations made by controller circuit 3 are stored. This second memory zone 8 is provided particularly for storing depth measurements and the corresponding time-related measurements relating to the last dive or dives, by way of illustration.

From these respective input signals, controller circuit 3 determines the situation and the state of the diver at every instant, from the point of view of diving. For this purpose, in time mode, the device can provide for a pressure measurement to be taken every five minutes and, in dive mode, a pressure measurement to be taken every two seconds, for example. From all of these periodic measurements and on the basis of the programme stored in first memory zone 7, controller circuit 3 determines a certain number of parameters relevant to the diver's health, i.e. in particular, the residual nitrogen rate dissolved in his body and the quantity of microbubbles formed, for example.

Moreover, in the example embodiment described, watch 1 has an analogue type display, comprising in particular hour 9 and minute 10 hands, controlled by two-directional motors (not shown). Thus, controller circuit 3 is programmed to generate adapted signals for a control circuit 11 for the two-directional motors, such that hour and minute hands 9 and 10 display information relating to the current time, in a first time mode, and information relating to diving in a second dive mode. The watch further includes a control member 12, such as a stem-crown, provided in particular for adjusting the current time or for activating particular functions. By way of non-limiting example, FIG. 1 shows three positions referenced A, B and C for control member 12, position A being a rest position, position B a pushed-in unstable position and position C a pulled-out stable position.

The reader interested in the operation of a portable electronic device of this type could consult, for example, EP Patent Application Nos. 1 396 766 A1 and 1 396 767 A1, both filed in the name of Asulab S. A. on 4 Sep. 2002 and entitled "Electronic diving watch with analogue display", in order to obtain further details. In fact, since the method according to the invention concerns the passage from a first operating mode to the dive mode, the operation of the latter will not be discussed in detail in the present Application.

Figure 2:
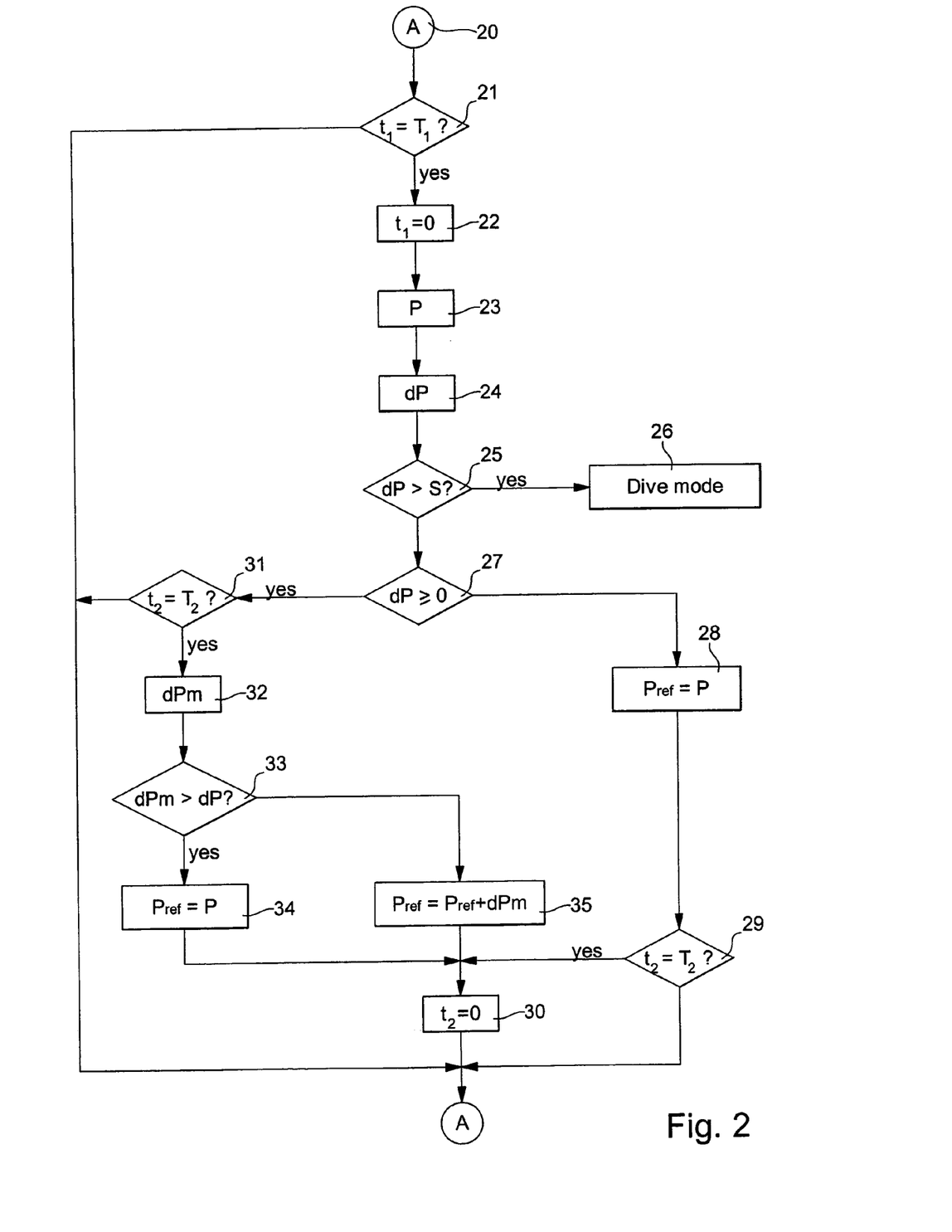
FIG. 2 is a diagram schematically showing the steps of the method for detecting the start of a dive according to a first embodiment of the present invention.
Figure 3:
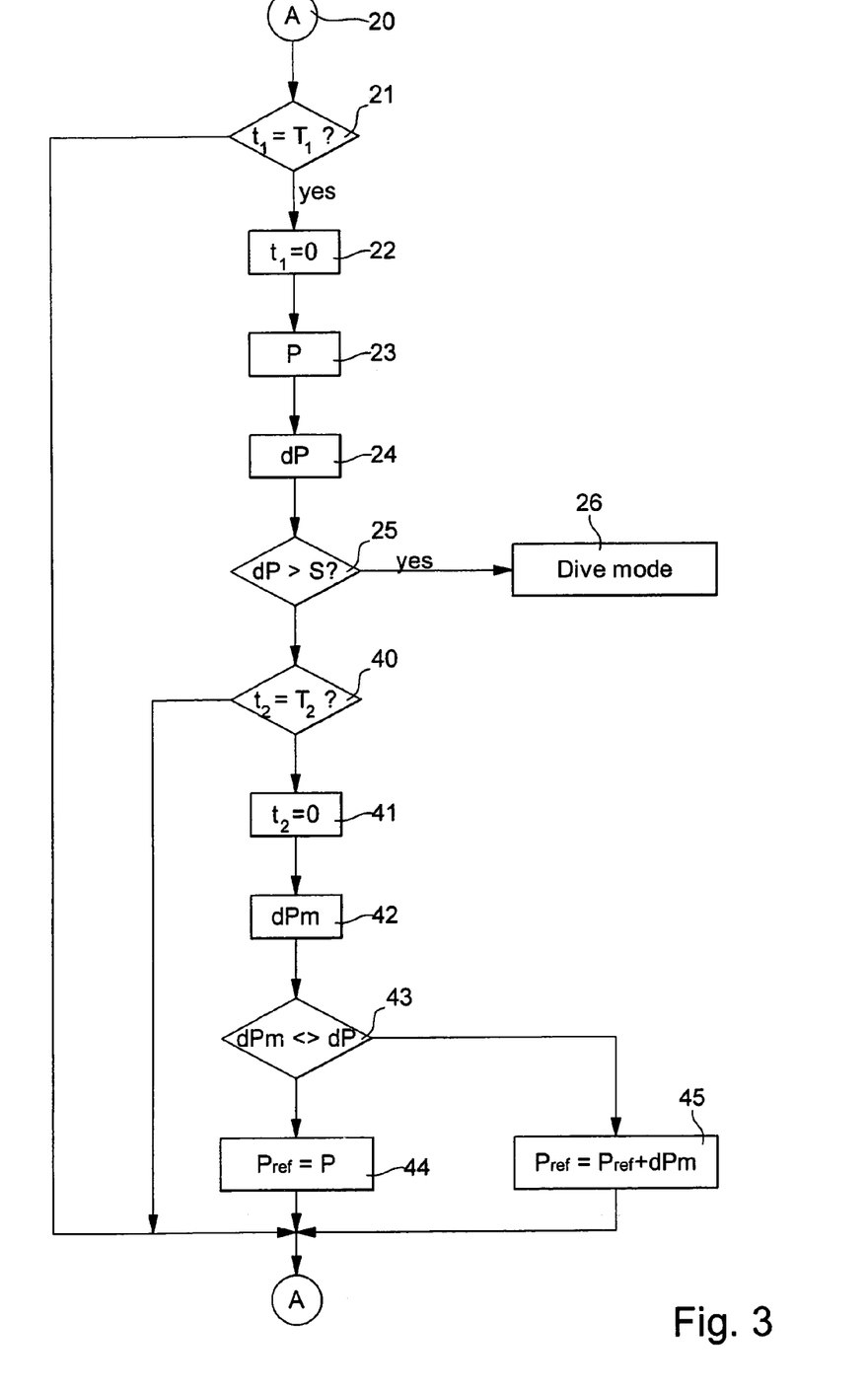
FIG. 3 is a diagram schematically showing the steps of the method for detecting the start of a dive according to a second embodiment of the present invention.
Figure 4:
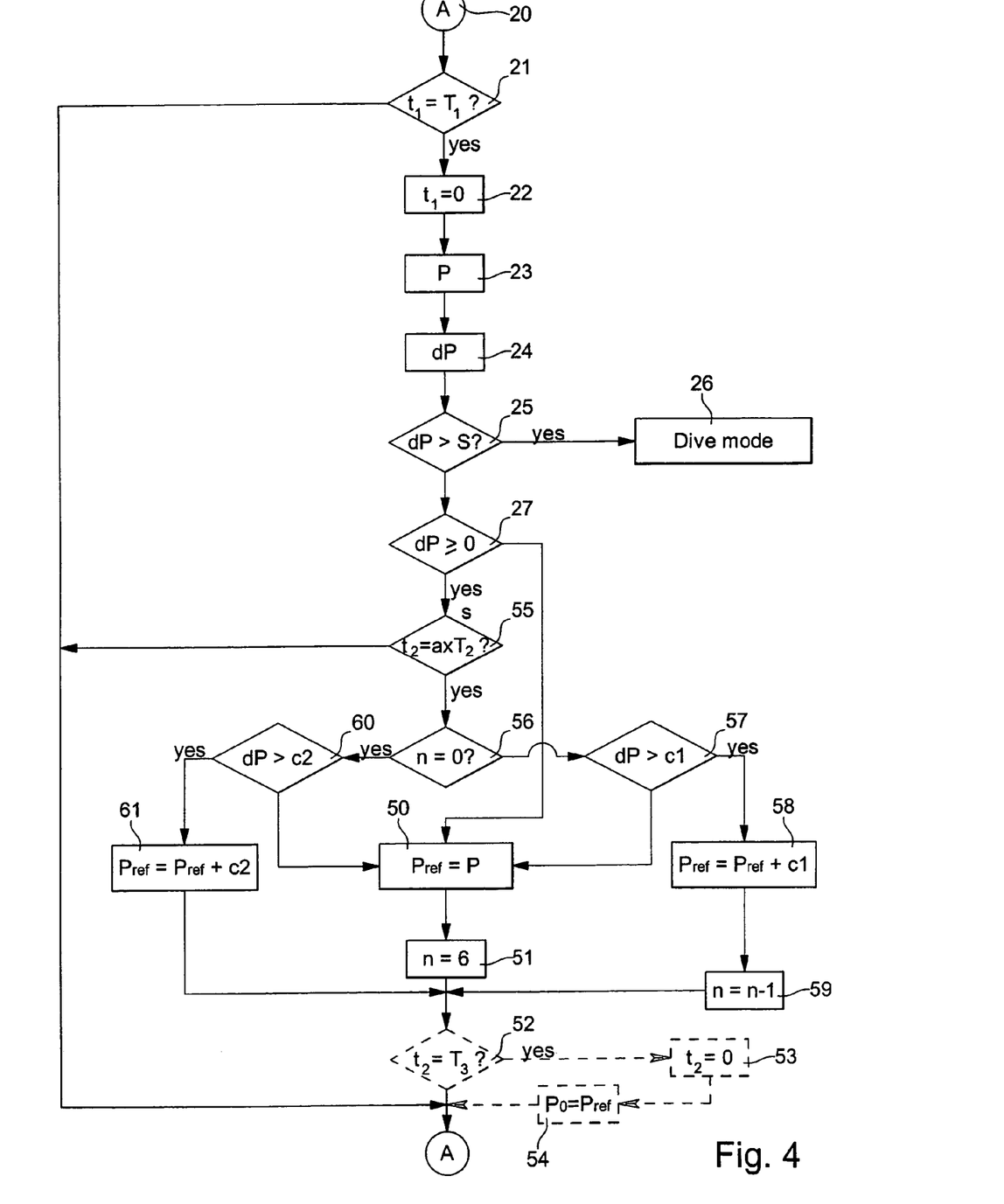
FIG. 4 is a diagram schematically showing the steps of the method for detecting the start of a dive according to a third embodiment of the present invention.

FIGS. 2 to 4 show diagrams relating to three embodiments of the dive start detection method according to the present invention, the description of these embodiments being provided by way of non-limiting example. These three methods allow the pressure measurements periodically taken by pressure sensor 5 to be "filtered" in order to limit inadvertent triggering of the dive mode, as can happen with certain devices of the prior art, when for example quickly descending a mountain. Likewise, these methods aim to prevent a device that implements them failing to detect the start of a dive, because for example the user stays in the water for a moment, at the surface, before actually beginning the dive.

FIG. 2 shows a schematic diagram detailing the main steps of the dive start detection method according to a first embodiment of the present invention.

Controller circuit 3 is programmed to periodically power pressure sensor 5 when the watch is in time mode, to carry out ambient pressure value measurements.

The method starts at stage A, marked by the reference numeral 20, of the diagram, a previously measured pressure value being stored as the reference pressure Pref. Further, a first counter (not shown) is provided for measuring first time intervals t1, this counter having a value t1 comprised between 0 and T1 at stage A, T1 being a measurement period value. Preferably, period T1 is substantially comprised between 0.1 and 10 seconds.

At step 21 of the diagram, from stage A, controller circuit 3 tests the value of the first counter. While the counter value is not equal to T1, the method returns to step A, preferably, but not in a limitative manner, once per second, the counter value being incremented each time.

When the value of the first counter reaches the value T1, the latter is reset to zero, at 22 in FIG. 2.

Pressure sensor 5 is then powered to carry out a measurement of ambient pressure P, at 23. On the basis of the measurement carried out, controller circuit 3 calculates a pressure variation dP, at 24, on the basis of the pressure measurements last measured and previously stored reference pressure Pref.

Controller circuit 3 then compares, at 25, the value calculated for pressure variation dP to a predefined value S, called the trigger threshold, and which corresponds to a water height preferably comprised between 0.2 and 1.5 meters.

When the value of pressure variation dP exceeds the trigger threshold S, the dive mode is activated, at 26.

In the opposite case, namely when the value of pressure variation dP is less than trigger threshold S, controller circuit 3 carries out an additional test on the value of pressure variation dP, at 27. More specifically, the controller circuit determines the sign of dP, this operation being preferably carried out at the same frequency as the ambient pressure measurements, at 23. However, as an alternative, the frequency of test 27 could be different from that of the ambient pressure measurements without departing from the scope of the present invention.

On the one hand, when the result of test 27 indicates that the value of dP is negative, which corresponds to a decrease in pressure between the last time that reference pressure measurement value Pref was stored and the last ambient pressure measurement P carried out, this latter value is stored as the new reference pressure value Pref, at 28.

It will be noted, at 29 in FIG. 2, that the value t2 of a second counter, whose function will be explained hereinafter, is tested. When value t2 is equal to a value T2 which corresponds to a second calculating frequency of the detection method according to the present invention, it is reset to zero, at 30, before starting the method again at A. When value t2 of the second counter is less than T2, the method is restarted directly at A by carrying out an increment of t2.

On the other hand, when the result of test 27 indicates that the value of dP is positive or zero, which corresponds to an increase or stagnation of the pressure between the last time reference pressure value Pref was stored and the last ambient pressure measurement P carried out, the controller circuit passes to an additional test at 31.

Additional test 31 consists in checking whether value t2 of the second counter has reached the value T2, corresponding to frequency f2 at which the stored reference pressure value is capable of being corrected, this second frequency f2 being lower than frequency f1 at which measurements of ambient pressure value P are carried out.

Frequency f2 has to be sufficiently low, in other words the corresponding period T2 has to be sufficiently long, for the pressure variation to have a significant value from the point of view of correcting reference pressure value Pref. Preferably, a value of T2 substantially comprised between 30 seconds and 10 minutes will be used, namely a frequency f2 of the order of 0.001 to 0.04 Hz.

When value t2 is less than T2, the method is started again directly at A by carrying out an increment of t2.

When the value of t2 is equal to T2, controller circuit 3 carries out a new calculation at 32, the purpose of which is to evaluate the recent behaviour of the ambient pressure value with respect to its mean behaviour taken over a longer period of time. For this purpose, controller circuit 3 stores the last value of pressure variation dP calculated in memory zone 8, the latter preferably comprising at least four slots for this. Thus, the last value of pressure variation dP calculated is stored by replacing the oldest dP value still in the memory. The controller circuit then calculates the mean value dPm of the pressure variation on the basis of the last four values stored, referenced dPi-3, dPi-2, dPi-1 and dP, simply by adding them together and dividing the result of the addition by four.

From the value dPm calculated hereinbefore, controller circuit 3 compares, at 33, this mean value to the last value of pressure variation dP calculated.

When the last value of pressure variation dP is less than dPm, the value of reference pressure Pref is updated with the last measured value of ambient pressure P, at 34. Once the update is completed, value t2 of the second counter is reset to zero at 30 and the method starts again at stage A.

When the last value of pressure variation dP is higher than dPm, the next step at 35 is for correcting the value of reference pressure Pref. In this case, it is assumed that the last pressure variation calculated is too large with respect to this variation taken into account over a longer period of time, this is why this variation is not entirely propagated over the stored reference pressure value Pref. Consequently, the mean value dPm calculated at 32 is added to the last stored reference pressure value, the result of this addition being stored as the new reference pressure value Pref, to take account of the recent tendency in terms of ambient pressure variation value. The effect of this correction is to "smooth" the variations of the reference pressure value Pref to filter abrupt ambient pressure variations.

Once the reference pressure value Pref has been corrected, value t2 of the second counter is reset to zero at 30 and the method starts again at A.

This set of steps is repeated indefinitely while the value of pressure variation dP calculated at 24 does not exceed trigger threshold S in the test carried out at 25.

According to a preferred variant of the method that has just been described, the stored pressure variation values dPi-3, dPi-2, dPi-1 and dP are replaced by zero in memory zone 8 during implementation of step 28, i.e. when controller circuit 3 determines that the last calculated pressure variation value is negative at step 27.

The general operating principle of the method according to the present embodiment is based on the fact that the ambient pressure increases considerably at the start of a dive. Thus, when the pressure value varies quickly by a value sufficient to exceed the trigger threshold, the dive mode is activated. In the opposite case, two cases can be identified, namely the first case where there is a decrease in the ambient pressure and the second case where there is a moderate increase in the ambient pressure.

In the first case, it is assumed that the user is not in the water but that he is gaining in altitude. The stored reference pressure value Pref is then updated with a relatively high frequency, i.e. of the order of several seconds, so that the stored value is representative of real value of the atmospheric pressure with a high level of precision. By way of example, such a measurement is fully justified when the person wearing a device implementing the present method goes by car to a high altitude lake in order to make a dive there.

In the second case, a moderate increase in the ambient pressure can be attributed to two different causes, either entry into water while remaining at a low depth, or a quick descent at the surface, like for example a quick mountain descent by car or even during air sports. The method according to the present invention enables these events to be taken into account because the reference pressure is updated but with a relatively low frequency compared to the frequency of the ambient pressure measurements. Moreover, when the increase in ambient pressure becomes too large, this increase is propagated over the stored reference pressure value Pref but attenuated thereby. Thus, the ambient pressure variations are taken into account while undergoing a sort of smoothing during processing by the controller circuit.

Owing to such a method, detection of the start of a dive can be guaranteed with a high level of reliability, inadvertent triggering of the dive mode being also greatly limited.

FIG. 3 shows a schematic diagram detailing the main steps of the method for detecting the start of a dive according to a second embodiment of the present invention.

As the first steps of the method according to this embodiment as far as comparison of the pressure variation value to the trigger threshold value S at 25, are the same as in the first embodiment, they will not be described in detail. Moreover, the reference numerals used within the scope of the first embodiment for these steps have been carried over to FIG. 3.

When the pressure variation value dP is less than trigger threshold S, which corresponds to an increase or stagnation in the pressure between the last time that reference pressure value Pref was stored and the last ambient pressure measurement P carried out, the controller circuit passes to an additional test at 40.

The additional test 40 consists in checking whether the value t2 of a second counter has reached the value T2 corresponding to the frequency f2 at which the stored reference pressure value is capable of being corrected. This second frequency f2 is lower than the frequency f1 at which the ambient pressure measurements P are carried out.

Frequency f2 is here of the same order of grandeur as in the first embodiment. Preferably, a T2 value substantially comprised between 30 seconds and 10 minutes will be taken, namely a frequency f2 of the order of 0.001 and 0.04 Hz.

When the value t2 is less than T2, the method will be started again directly at A by carrying out an increment of t2.

When the value of t2 is equal to T2, controller circuit 3 resets value t2 of the second counter at 41, before making a new calculation, at 42, the purpose of which is to evaluate the recent behaviour of the ambient pressure value with respect to its mean behaviour taken over a longer period of time. This step 42 is similar to step 32 described in relation to the first embodiment. Controller circuit 3 stores the last calculated pressure variation value dP in the memory zone 8, this latter preferably comprising at least four slots for this purpose. Thus, the last calculated pressure variation value dP is stored replacing the oldest dP value still in the memory. The controller circuit then calculates the mean pressure variation value dPm on the basis of the last four values stored in the memory, referenced dPi-3, dPi-2, dPi-1 and dP, simply by adding them together and dividing the result of the addition by four.

From the value dPm calculated hereinbefore, controller circuit 3 compares, at 43, the absolute value of this mean value to the absolute value of the last calculated pressure variation value dP.

When the last pressure variation value dP is less than dPm, in absolute value, the reference pressure value Pref is updated with the last measured value of the ambient pressure P at 44. Once the update is completed, the method starts again at step A.

When the last pressure variation value dP is higher than dPm, in absolute value, at 45, there is a step of correcting the reference pressure value Pref. In such case, it is assumed, in fact, that the last calculated pressure value is too large with respect to the variation taken into account over a longer period of time, which is why this variation is not entirely propagated onto the stored reference pressure value Pref. Consequently, the mean value dPm calculated at 42 is added to the last stored reference pressure value, the result of this addition being stored as the new reference pressure value Pref, to take into account the recent tendency in terms of ambient pressure value variation. The effect of this correction is to "smooth"

the reference pressure value variations Pref, to filter the abrupt ambient pressure variations.

Once the reference pressure value Pref has been corrected, the method is started again at step A.

This set of steps is repeated indefinitely while the pressure variation value dP calculated at 42 does not exceed trigger threshold S in the test carried out at 25.

According to a preferred variant of the method that has just been described, the stored pressure variation values dPi-3, dPi-2, dPi-1 and dP are replaced by zero in memory zone 8 during implementation of step 44, i.e. when controller circuit 3 determines that the last calculated pressure variation value is sufficiently low to replace the stored reference pressure value by the last measured ambient pressure value.

Two significant variations can be noted in this method with respect to that described in relation to the first embodiment.

On the one hand, it will be noted that the reference pressure value Pref is always updated at frequency f2, which can lead to less precision as to the stored reference pressure value with respect to the real surface pressure, in certain particular circumstances of use.

On the other hand, it will be noted that no distinction is made according to the sign of the calculated pressure variation as is the case at step 27 of the method according to the first embodiment. In fact, comparison of the last calculated pressure variation value dP with the mean value dPm occurs in absolute values. Thus, the processing subsequently carried out by controller circuit 3 is the same whether dP is positive or negative. Consequently, smoothing of the ambient pressure variations occurs in both directions, in other words, all of the ambient pressure value variations are attenuated, before the latter is stored as the reference pressure, whether these variations correspond to decreases or increases in the ambient pressure.

FIG. 4 shows a schematic diagram detailing the main steps of the method for detecting the start of a dive according to a third embodiment of the present invention.

As the first steps of the method according to the present embodiment as far as determination of the sign of the pressure variation, at step 27, are the same as in the first embodiment, they will not be described in detail. Moreover, the reference numerals used in the first embodiment for these steps have been carried over to FIG. 4.

The method according to this embodiment differs from the two preceding embodiments mainly by the nature of the quantity used for correcting the stored reference pressure value, which here is a predefined quantity and no longer a quantity based on measured ambient pressure values.

When the result of test 27 indicates that the value of dP is negative, which corresponds to a pressure decrease between the last stored reference pressure value Pref and the last ambient pressure measurement P carried out, this latter value is stored as the new reference pressure value Pref, at 50.

It can be observed next at 51, in FIG. 4, that controller circuit 3 attributes a particular value, 6 here, to the value n of an additional counter, whose function will be explained hereinafter.

In a preferred implementation variant, the value t2 of a second counter, similar to that described in relation to the preceding embodiments, is then tested at 52. When the value t2 is equal to a value T3, which corresponds to a third update frequency f3, it is reset to zero, at 53, while the last stored reference pressure value Pref is saved as the surface pressure $P_0$, at 54, the latter being used as reference in the dive mode. Following this update, which is not indispensable for implementing the detection method according to the present invention, the method is restarted at A. When the value t2 of the second counter is lower than T3, the method is restarted directly at A by carrying out an increment of t2. As mentioned hereinbefore, a T3 value comprised between 30 seconds and 10 minutes will be taken, namely a corresponding frequency f3 of the order of 0.001 to 0.04 Hz.

On the other hand, when the result of test 27 indicates that the value of dP is positive or zero, which corresponds to an increase or stagnation of pressure between the last time that reference pressure value Pref was stored and the last ambient pressure measurement P carried out, the controller circuit passes to an additional test at 55.

Additional test 55 consists in checking whether value t2 of the second counter has reached a value a*T2, a being an integer number and T2 corresponding to a frequency f2 at which the stored reference pressure value is capable of being corrected, this third frequency f2 being comprised between frequencies f1 and f3.

Frequency f2 has to be sufficiently low, in other words the corresponding period T2 has to be sufficiently long, for the pressure variation to have a significant value from the point of view of correcting reference pressure value Pref. Preferably, a T2 value substantially comprised between 30 seconds and 5 minutes will be taken, namely a frequency f2 of the order of 0.003 to 0.04 Hz.

When value t2 is not a multiple of T2, the method is restarted directly at A, by carrying out an increment of t2.

When the value t2 of the second counter is equal to a*T2, in other words it is a multiple of T2, one passes to test 56 of the value n of the additional counter.

If the value n of the additional counter is different to zero, the controller circuit carries out another test, at 57, on the basis of the last calculated pressure variation value dP. The value of dP is compared to a predefined quantity c1 whose value corresponds to a water height of the order of 2 to 40 cm.

When the value of dP is less than c1, called the first correction factor, the end of the detection method is restarted, as described hereinbefore, at step 50 where the stored reference pressure Pref is updated by taking the last measured ambient pressure value P.

When the value of dP is higher than c1, the controller circuit performs a correction of the reference pressure value Pref, at 58, by storing the sum of the last stored value Pref with the value of c1 as the new reference pressure value Pref. Then, the value n of the additional counter is decremented at 59 before continuing the end of the method by returning to step 52, which was previously described.

It is thus observed that starting from a value n equal to six in the additional counter, six successive passages through steps 57 to 59 are necessary to return the value n to zero.

At such a stage, the result of the test at 56 is different from what has just been described, which modifies the steps that follow this test.

In fact, when the value n of the additional counter is equal to zero at 56, controller circuit 3 carries out a different test, at 60, on the basis of the last calculated pressure variation value dP. This latter is then compared to a second predefined quantity c2, called the second correction factor, whose value is comprised between the respective values of c1 and S.

When the result of this test 60 leads to the observation that dP is less than c2, the method returns to step 50, where the last measured ambient pressure value is stored as the new reference pressure value Pref.

When the value of dP is higher than c2, one continues to step 61, which forms an additional step of correcting the reference pressure value Pref. During this step, the sum of the last stored reference pressure value with c2 is stored as the new reference pressure value Pref.

The method continues after this correction step, by returning to step 52 that has already been described.

This set of steps is repeated indefinitely while the value of pressure variation dP calculated at 24 does not exceed trigger threshold S in the test carried out at 25.

This method provides a distinction as to the sign of the last calculated pressure variation value dP, like the method according to the first embodiment, the reference pressure being corrected only in cases where the ambient pressure variation does not decrease.

The essential difference distinguishing the method according to the present embodiment from the preceding embodiments lies in the fact that the quantity used to correct the reference pressure value Pref does not take account of the past development of the ambient pressure value insofar as it corresponds to a predefined constant.

Moreover, it is clear that the steps linked to use of an additional counter of value n are not indispensable for implementing the detection method according to this embodiment, more particularly as regards test 60 and correction step 61.

In fact, the increases in measured pressure P are propagated over the stored reference pressure value Pref while being attenuated. In other words, correction step 58, like step 61, limits with a value c1, the increase in the reference pressure value to be stored, in order to smooth increases in the ambient pressure.

Thus, in the particular case where the ambient pressure increases in a quasi-continuous manner for several minutes, if the correction mentioned at step 58 alone is carried out, the stored reference pressure value moves further and further away from the real ambient pressure value.

This is why it is preferable to implement an additional correction step 61 during which the reference pressure value to be stored is also limited but with a value c2 higher than c1. This additional step enables the precision of the method according to the third embodiment to be further increased.

Those skilled in the art will of course be able to provide the update of surface pressure $P_0$, as described at step 54 of this embodiment, in the preceding embodiments. Such a precaution in fact allows a high level of precision to be guaranteed for this value, which is subsequently used, in the dive mode, to carry out depth calculations and, to determine data relating to the safety of the person wearing the device.

The preceding description corresponds to preferred embodiments of the invention and should in no way be considered to be limitative, as regards more particularly the structure described for the watch, the functions described, the nature and the number of control members used. As previously mentioned, the detection method according to the present invention can be implemented in any portable electronic device of the diving computer type, whether the display is analogue or digital. Likewise, the invention is not limited to the operating modes described, insofar as these parameters can be modified by suitable programming of the controller circuit. Those skilled in the art will not encounter any particular difficulty in adapting the method according to the present invention to their own needs, particularly as regards the values provided by way of example for the frequencies and the correction quantities.

What is claimed is:

1. A method adapted to be implemented in a portable electronic device having at least a first operating mode and a second operating mode, called the dive mode, and comprising in particular a pressure sensor for measuring the value of the ambient pressure (P) and electronic circuits for processing the results of said measurements comprising a time base and at least one memory zone, the method being implemented in said first operating mode for detecting a start of a dive and automatically switching said portable electronic device over to said dive mode when the start of a dive is detected, said method comprising the steps of:
   a) measuring an ambient pressure value and storing it as a reference value (Pref);
   b) periodically measuring the value of the ambient pressure (P) at a first frequency (f1),
   c) periodically calculating the value of the variation in pressure (dP) between the measured ambient pressure (P) and the reference pressure (Pref) at a first frequency (f1) and comparing said pressure variation value (dP) to a predefined value, called the trigger threshold (S) stored in the memory zone (7),
   d) if the pressure variation value (dP) is higher than said trigger threshold, then switching over to said dive mode; if not, then continuing to step e),
   e) comparing, at a second frequency (f2), said pressure variation value (dP) to a predefined quantity (c1), stored in said memory zone, or determined (dPm) on the basis of measured pressure values, said quantity being lower than said trigger threshold (S), said second frequency (f2) being lower than or equal to said first frequency (f1),
   f) if the pressure variation value (dP) is higher than said quantity, then making a correction to the reference pressure value (Pref); if not, then storing the last measured pressure value (P) as the new reference pressure value (Pref),
   g) returning to step b).

2. The detection method according to claim 1, further including, after step d), the steps consisting in:
   d') periodically determining, at a third frequency (f3), the sign of the pressure variation (dP), said third frequency (f3) being comprised between said first and second frequencies (f1, f2),
   d'') storing the value of the last measured pressure as the reference pressure value (Pref) then returning to step b) if said pressure variation (dP) is negative or, in the opposite case, continuing to step e).

3. The detection method according to claim 2, wherein, when said quantity is predefined, the latter being called the first correction factor (c1), said correction at step f) consists in adding said first correction factor (c1) to said stored reference pressure value, the result of the addition being stored as the new reference pressure value (Pref).

4. The detection method according to claim 3, wherein, completion of steps e) to g) defining a cycle, said first correction factor (c1) is replaced in steps e) and f), in one cycle in every n cycles, by an additional predefined quantity, called the second correction factor (c2) and the value of which is comprised between those of said first correction factor and said trigger threshold, when a correction has been made to the reference pressure value during the last n−1 cycles carried out, n being an integer number comprised between two and ten.

5. The detection method according to claim 2 wherein, when said quantity is defined on the basis of measured pressure values, step e) further includes an action of storing said pressure variation value (dP) at said second frequency (f2), at least the last three pressure variation values (dPi-2, dPi-1, dP) stored being used to calculate said quantity, this latter corresponding to the result of the calculation of the mean pressure variation (dPm) over said at least last three values, said correction at step f) consisting in adding said quantity (dPm) to said stored reference pressure value, the result of the addition being stored as the new reference pressure value (Pref).

6. The detection method according to claim 5 wherein said quantity is calculated on the basis of the last four pressure variation values (dPi-3, dPi-2, dPi-1, dP) stored.

7. The detection method according to claim 6 wherein, when the sign of the last calculated pressure variation (dP) is negative in step d"), the stored pressure variation values (dPi-3, dPi-2, dPi-1, dP) are all replaced by zero before returning to step b).

8. The detection method according to claim 5 wherein, when the sign of the last calculated pressure variation (dP) is negative in step d"), the stored pressure variation values (dPi-3, dPi-2, dPi-1, dP) are all replaced by zero before returning to step b).

9. The detection method according to claim 2 wherein the first and third frequencies (f1, f3) are equal.

10. The detection method according to claim 1, wherein, when said quantity is predefined, the latter being called the first correction factor (c1), said correction at step f) consists in adding said first correction factor (c1) to said stored reference pressure value, the result of the addition being stored as the new reference pressure value (Pref).

11. The detection method according to claim 10 wherein, completion of steps e) to g) defining a cycle, said first correction factor (c1) is replaced in steps e) and f), in one cycle in every n cycles, by an additional predefined quantity, called the second correction factor (c2) and the value of which is comprised between those of said first correction factor and said trigger threshold, when a correction has been made to the reference pressure value during the last n−1 cycles carried out, n being an integer number comprised between two and ten.

12. The detection method according to claim 1 wherein, when said quantity is defined on the basis of measured pressure values, step e) further includes an action of storing said pressure variation value (dP) at said second frequency (f2), at least the last three pressure variation values (dPi-2, dPi-1, dP) stored being used to calculate said quantity, this latter corresponding to the result of the calculation of the mean pressure variation (dPm) over said at least last three values, said correction at step f) consisting in adding said quantity (dPm) to said stored reference pressure value, the result of the addition being stored as the new reference pressure value (Pref).

13. The detection method according to claim 12, wherein said quantity is calculated on the basis of the last four pressure variation values (dPi-3, dPi-2, dPi-1, dP) stored.

14. The detection method according to claim 1, wherein said first frequency (f1) has a value substantially comprised between 0.1 and 10 Hz.

15. The detection method according to claim 1, wherein said second frequency (f2) has a value substantially comprised between 0.001 and 0.04 Hz.

16. The detection method according to claim 1, wherein the value of said trigger threshold corresponds to a height of water substantially comprised between 0.2 and 1.5 meters.

17. The detection method according to claim 1, comprising an additional step implemented at a third frequency (f3) and during which the stored reference pressure value (Pref) is saved in an additional memory zone to be subsequently used in the dive mode as the real pressure value at the surface of the body of water in which the dive is made.

18. The computer programme installed in a controller circuit for implementing the method according to claim 1.

19. The controller circuit for a portable electronic device arranged for implementing the detection method according to claim 1.

20. The portable electronic device including a controller circuit according to claim 19.

21. A method adapted to be implemented in a portable electronic device having at least a first operating mode and a second operating mode, called the dive mode, and comprising in particular a pressure sensor for measuring the value of the ambient pressure and electronic circuits for processing the results of said measurements comprising a time base and at least one memory zone, the method being implemented in said first operating mode for detecting a start of a dive and automatically switching said portable electronic device over to said dive mode when the start of a dive has been detected, said method comprising the steps of:
   a) measuring an ambient pressure value and storing it as a reference value (Pref);
   b) periodically measuring the value of the ambient pressure (P) at a first frequency (f1),
   c) periodically calculating the value of the variation in pressure (dP) between the measured ambient pressure (P) and the reference pressure (Pref) at said first frequency (f1) and comparing said pressure variation value (dP) to a predefined value, called the trigger threshold (S) stored in said memory zone,
   d) if the pressure variation value (dP) is higher than said trigger threshold, then switching over to said dive mode; if not, then continuing to step e),
   e) periodically comparing, at a second frequency (f2), the absolute value of said pressure variation (dP) to a predefined quantity (c1), stored in said memory zone, or determined on the basis of measured pressure values, said quantity being less than said trigger threshold (S),
   f) if the absolute value of the pressure variation (dP) is higher than said quantity, then making a correction to the reference pressure value (Pref); if not, then storing the last measured pressure value (P) as the new reference pressure value (Pref),
   g) returning to step b).

22. The detection method according to claim 21 wherein step e) further includes an action of storing said pressure variation value (dP) at said second frequency (f2), at least the last three pressure variation values (dPi-2, dPi-1, dP) stored being used to calculate said quantity, this latter corresponding to the absolute value of the result of the calculation of the mean pressure variation (dPm) of said at least last three values, said correction at step f) consisting in adding said mean pressure variation value (dPm) to said stored reference pressure value, the result of the addition being stored as the new reference pressure value (Pref).

* * * * *